United States Patent
Bauer et al.

(10) Patent No.: US 6,755,178 B2
(45) Date of Patent: Jun. 29, 2004

(54) METHOD AND APPARATUS FOR MONITORING A DRIVE UNIT OF A VEHICLE AND/OR COMPONENTS ALLOCATED THERETO

(75) Inventors: Juergen Bauer, Leonberg (DE); Andreas Huber, Steinheim (DE); Volker Pitzal, Waldstetten/Wissgoldingen (DE); Udo Schulz, Vaihingen/Enz (DE)

(73) Assignee: Robert Bosch GmbH, Stuttgart (DE)

( * ) Notice: Subject to any disclaimer, the term of this patent is extended or adjusted under 35 U.S.C. 154(b) by 83 days.

(21) Appl. No.: 10/174,472

(22) Filed: Jun. 18, 2002

(65) Prior Publication Data

US 2003/0018426 A1 Jan. 23, 2003

(30) Foreign Application Priority Data

Jun. 19, 2001 (DE) ........................... 101 29 448

(51) Int. Cl.⁷ ................... F02D 41/04; F02D 43/00
(52) U.S. Cl. ................... 123/339.15; 123/399
(58) Field of Search ............ 123/339.15, 339.25, 123/339.26, 339.27, 339.28, 399; 73/118.1, 118.2, 119 R; 180/197; 477/109

(56) References Cited

U.S. PATENT DOCUMENTS

| | | | |
|---|---|---|---|
| 5,484,351 A | 1/1996 | Zhang et al. | 477/113 |
| 6,073,715 A | 6/2000 | Wolf et al. | 180/197 |
| 6,155,230 A * | 12/2000 | Iwano et al. | 123/339.16 |
| 6,178,945 B1 * | 1/2001 | Suzuki et al. | 123/295 |
| 6,251,044 B1 * | 6/2001 | Streib | 477/120 |
| 2002/0171383 A1 * | 11/2002 | Hisada et al. | 318/432 |

FOREIGN PATENT DOCUMENTS

| | | |
|---|---|---|
| DE | 197 54 286 | 6/1999 |
| GB | 2 366 870 | 3/2002 |
| WO | Wo 02/12698 | 2/2002 |

* cited by examiner

Primary Examiner—Hai Huynh
(74) Attorney, Agent, or Firm—Kenyon & Kenyon

(57) ABSTRACT

In an apparatus and a method for monitoring a drive unit of a vehicle and/or components allocated thereto, a torque variable is determined that characterizes the torque requirement of the drive unit and/or the allocated components. Faults are recognized on the basis of the torque variable and/or a variable on the basis of which the torque variable is determined.

16 Claims, 2 Drawing Sheets

METHOD AND APPARATUS FOR MONITORING A DRIVE UNIT OF A VEHICLE AND/OR COMPONENTS ALLOCATED THERETO

FIELD OF THE INVENTION

The invention relates to a method and an apparatus for monitoring a drive unit of a vehicle and/or components allocated thereto.

BACKGROUND INFORMATION

In German Patent No. 43 04 779 (corresponding to U.S. Pat. No. 5,484,351), an apparatus is discussed for controlling the torque emitted by a drive unit of a vehicle. In this context, means are provided that calculate the setting of the power parameters of the drive unit that is necessary for providing the torque; a correction is provided dependent at least on the torque requirement of auxiliary systems, as well as on engine torque losses. Here, it is provided that the program maps in which the torque requirement is stored are additively determined.

Furthermore, methods and apparatuses have been used for monitoring internal combustion engines. For this purpose, sensors have been used that detect operating characteristics. Such monitoring devices are very expensive, because as a rule additional sensors are required.

SUMMARY OF THE INVENTION

According to an exemplary embodiment of the present invention, faults of the internal combustion engine and/or of the allocated components may be recognized on the basis of a variable that characterizes the torque requirement of the drive unit and/or allocated components. In this context, faults may be recognized on the basis of the torque variable and/or a variable on the basis of which the torque variable may be determined. In particular, it is provided that the torque variables may be adapted. Here, faults may be recognized on the basis of the variables used for the adaptation and/or on the basis of the adapted variables.

According to an exemplary embodiment of the present invention, in certain operating states an operating characteristic may be controlled to a target value, the controller having at least integral behavior. This may be preferably a controlling of the idle speed.

This may mean that in particular operating states, such as, for example, idling, it may be monitored whether the actual drag torque—i.e., the instantaneous output torque of the idle controller—agrees with the expected drag torque. This may be the case if the output signal of the idle controller is almost equal to an expected value. In this context, the expected value may be stored in a program map, preferably dependent on operating characteristics such as, for example, engine speed and a temperature variable.

If the drag torque does not agree, the stipulation of the drag torque may be corrected. On the basis of the variables used during the adaptation, such as the output signal of the idle controller, the deviation of the output signal of the idle controller from a comparison value, the value with which the drag torque may be corrected, and/or the drag torque, faults may be recognized when defined limits are exceeded.

DETAILED DESCRIPTION

Figure 1:
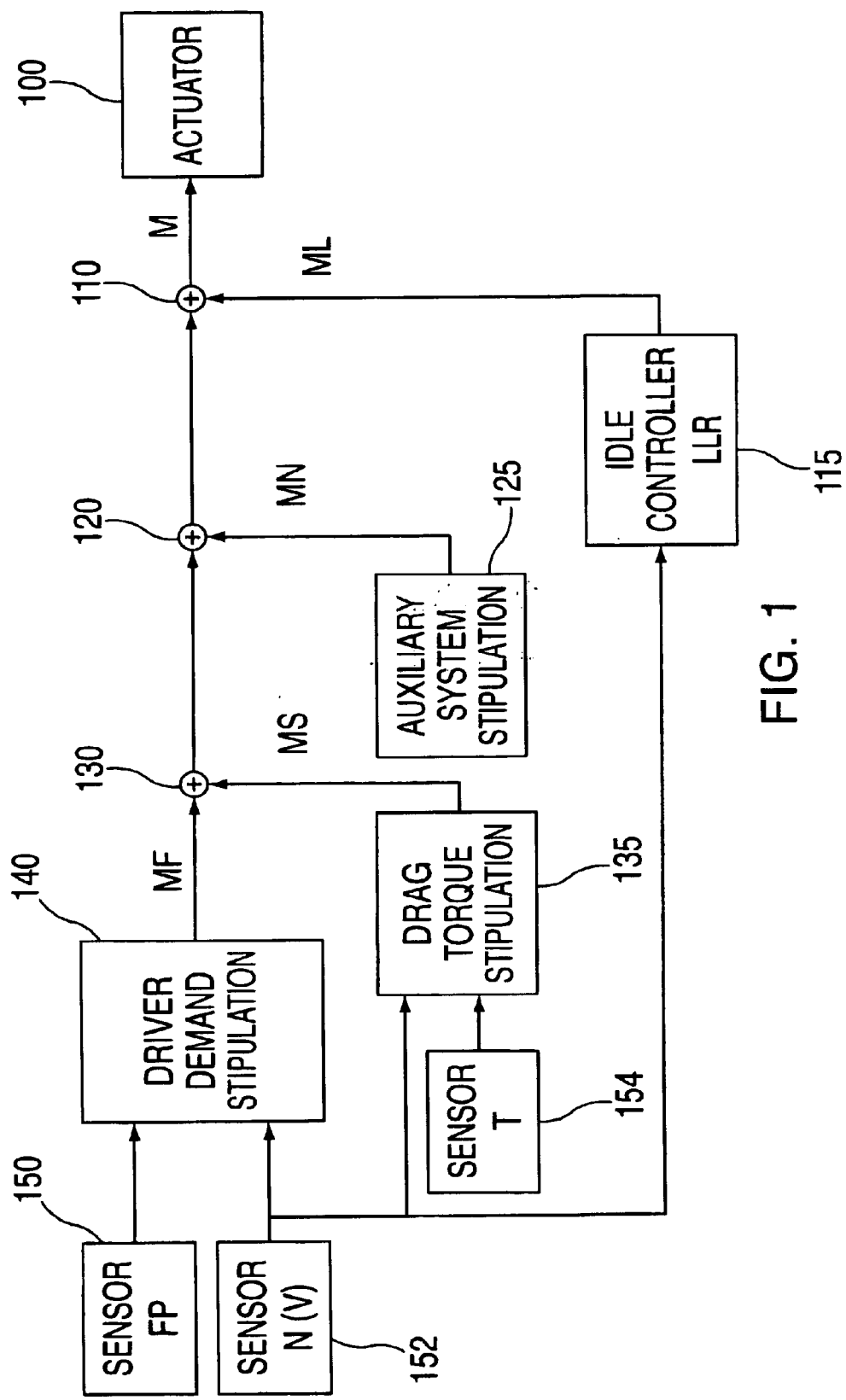
FIG. 1 is a block diagram illustrating a method for controlling a drive unit in accordance with the present invention, utilizing an apparatus in accordance with the present invention.

In FIG. 1, a method for controlling a drive unit of a vehicle in accordance with the present invention, utilizing an apparatus in accordance with the present invention, is shown. Reference character 100 designates an actuator with which the power output, in particular the torque, of an internal combustion engine may be controlled. Such an actuator may be, for example, a solenoid valve or a piezo-actuator with which the quantity of fuel to be injected may be influenced. This actuator may receive a signal M. Signal M may be provided by a node 110 at whose first input the output signal ML of an idle controller 115 may be present, and to whose second input the output signal of a node 120 may be applied. An output signal MN of an auxiliary system stipulation 125 may be applied to the first input of node 120. The second input of node 120 may receive the output signal of a node 130, to whose first input the output signal MS of a drag torque stipulation 135 may be applied. Output signal MF of the driver-demand stipulation may be supplied to the second input of node 130.

Driver-demand stipulation 140 may process various sensor signals, such as, for example, those of a sensor 150 that may detect the degree of actuation of an operating element actuated by the driver. This is, for example, the sensor for detecting accelerator pedal posiition FP. In addition, sensors 152 may be provided that detect engine speed N of the internal combustion engine and/or velocity V of the vehicle. Moreover, sensors 154 may be provided that supply temperature signals T. These may be evaluated in particular by drag torque stipulation 135.

On the basis of the driver's demand, driver-demand stipulation 140 may determine a driver-demand torque MF. Drag torque stipulation 135 may stipulate a drag torque MS that corresponds to the torque requirement necessary in order to overcome, in particular, the internal friction of the internal combustion engine. Auxiliary system stipulation 125 may specify an auxiliary system torque MN that may be required in order to compensate the torque requirement of various auxiliary systems. These two torque signals MS and MN may be added to driver-demand torque MF at nodes 130 and 120. At node 110, the output signal of an idle controller that provides an idle torque ML may be additionally added to this torque. Actuator 100 may then be controlled on the basis of this overall torque M.

The idle controller may specify idle torque ML on the basis of the comparison between the measured engine speed and the desired idle speed. Idle controller 115 may contain at least one integral portion (I-portion) and one proportional portion (P-portion).

Figure 2:
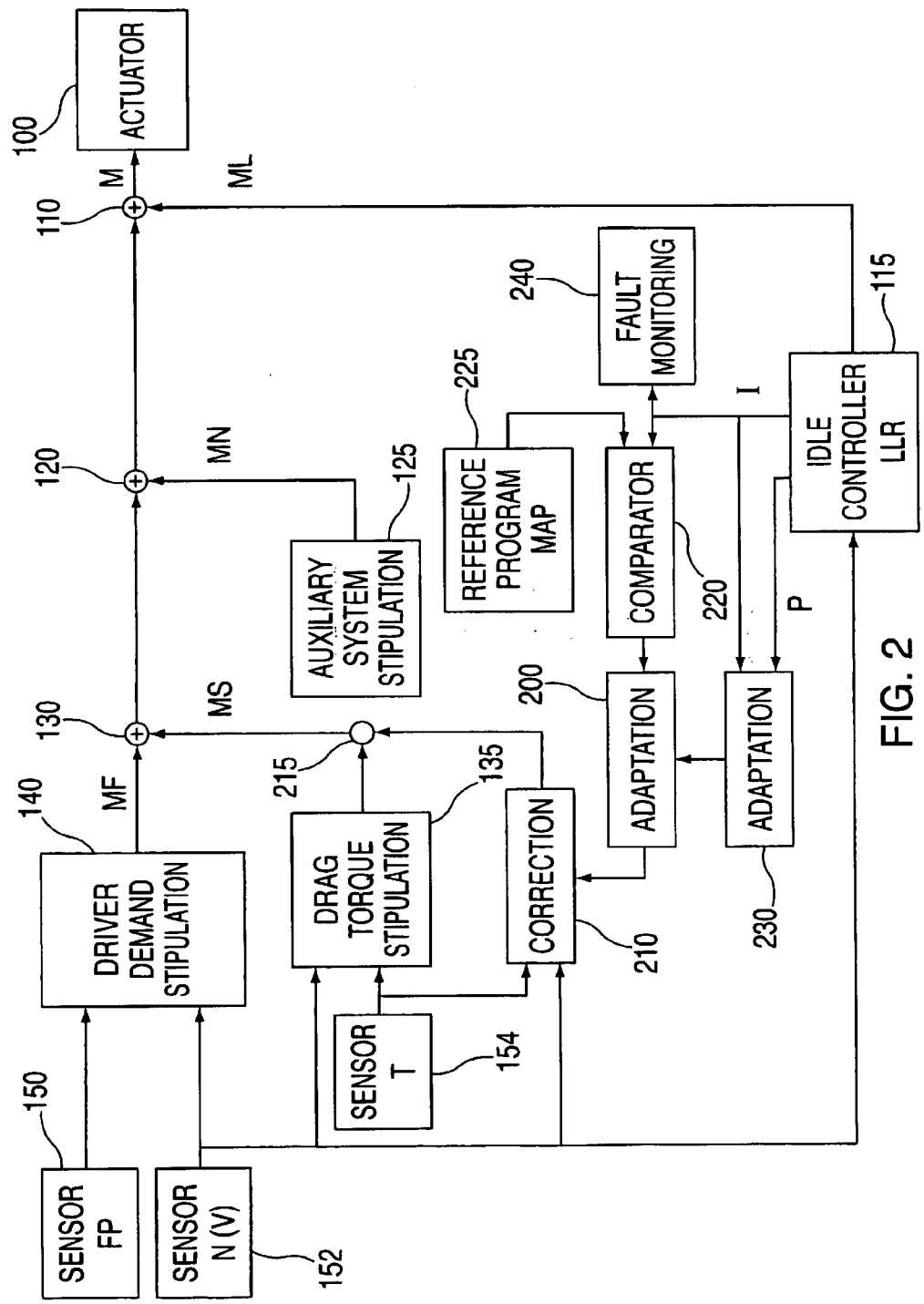
FIG. 2 shows a block diagram of an apparatus in accordance with an exemplary embodiment of the present invention.

In FIG. 2, an apparatus according to an exemplary embodiment of the present invention is shown in detail, in connection with the method in accordance with the present invention. Elements already described in FIG. 1 may be identified with corresponding reference characters. Adaptation 200 may send a signal to a correction 210. Correction 210 may supply a signal to node 215, to whose second input the output signal of the drag torque stipulation may be applied. The output signal of node 215 may reach node 130. Correction 210 may receive signal T of the temperature sensor and output signal N of the engine speed and/or vehicle-speed signal. Adaptation 200 may process the output signal of comparator 220, as well as the output signal of the enabling of adaptation 230.

Output signal I of the idle controller on the one hand, and the output signal of a reference program map 225 on the other hand, may be supplied to comparator 220. Reference program map 225 may process, among others, output signal N of the engine speed sensor and output signal T of the temperature sensor. Idle controller 115 may act upon the enabling of the adaptation 230 both with signal P and with signal I. In the exemplary embodiment shown, a fault monitoring 240 may receive output signal I of the idle controller.

This device may operate as follows. Reference values for the I-portion of the idle controller may be stored in reference program map 225, dependent on the operating characteristics, such as in particular engine speed and temperature. Usually, in the stationary state no control deviation may be present for the idle controller.

That is, the output signal of the P-portion of the idle controller may be zero. That is to say, the output of the idle controller may correspond to the I-portion of the idle controller. In the reference program map, dependent on engine speed N and temperature T, the output values of the idle controller may be applied that may need to be present if drag torque MS corresponds to the values stored in the drag torque stipulation.

If the instantaneous values of the I-portion correspond to the value stored in the reference program map, comparator 220 may emit no signal to adaptation 200. If, on the other hand, the values deviate from one another, then, if the adaptation is enabled, the corresponding value that is allocated to the instantaneous temperature and/or engine speed may be corrected in correction program map 210, dependent on the determined deviation value.

The enabling of adaptation 230 may check whether an adaptation is possible. In an exemplary embodiment, this may be possible only in true idling operation; i.e., the adaptation may take place only within a narrow range of engine speeds. In particular, an adaptation may take place given very small deviations between the target engine idle speed and the actual engine speed. Because the adaptation may take place over all temperature ranges, a correction of the drag torque program map may be possible for the entire temperature range.

In operating ranges in which no adaptation takes place, the values stored in correction 210 may be used for the correction of the output signal of drag torque stipulation 135.

In a refinement of the procedure according to the present invention, a corresponding procedure may also be carried out for the adaptation of the output signal of auxiliary system stipulation 125. This may mean that elements are provided for the adaptation of block 125 that may correspond to blocks 200 to 240.

Output signal I, which may characterize the integral portion of the idle controller, may be evaluated by fault detection 240. In particular, faults may be recognized if the I-portion is greater than a specified threshold value. Such a deviation of the I-portion may indicate that the drag torque is deviating permanently from its expected value. In this way, faults may be recognized with certainty in the area of the internal combustion engine that may lead to an increased drag torque and/or to a significantly lowered drag torque. Correspondingly, auxiliary systems, such as an air conditioner compressor, a generator, or the transmission, may also be monitored. In these, faults may be recognized if the I-portion is greater than an expected value.

Alternatively, it may also be provided that the output signal of comparator 220 may be supplied to fault detection 240. In this case, the output signal of comparator 220 may preferably be monitored in order to discover whether it is greater than a threshold value.

In addition, it may be provided that the output signal of correction 210 is also supplied to fault detection 240 and may correspondingly be evaluated.

As an additional alternative exemplary embodiment, it may be provided that faults may be recognized if one of the observed variables changes faster and/or slower than expected. That is, the rise or the fall of the observed variables may be greater and/or smaller than a threshold value.

According to an exemplary embodiment of the present invention, it may also be provided that not just one of the observed variables, but rather a plurality, or all, of the observed variables may be evaluated.

What is claimed is:

1. A method for monitoring one of a drive unit of a vehicle and components allocated to the drive unit, comprising:
   determining a torque variable that characterizes a torque requirement of at least one of the drive unit and the allocated components;
   recognizing faults based on at least one of the torque variable and a base variable; wherein the torque variable is determined based on the base variable;
   controlling with a controller an operating characteristic to a target value in selected operating states, wherein the controller exhibits at least integral behavior;
   determining a correction variable based on a deviation of a characterizing variable from a specified value, wherein the characterizing variable characterizes an integral portion of the controller; and
   correcting the torque variable with the correction value.

2. The method according to claim 1, wherein an engine speed is controlled to an idle speed while idling.

3. The method according to claim 1, wherein faults are recognized based on at least one of the characterizing variable, the correction variable and a corrected torque variable.

4. The method according to claim 3, wherein an engine speed is controlled to an idle speed while idling.

5. The method according to claim 1, wherein faults are recognized if at least one of: the characterizing variable is greater than a first threshold value; and the correction variable is greater than a second threshold value.

6. The method according to claim 5, wherein an engine speed is controlled to an idle speed while idling.

7. The method according to claim 1, wherein faults are recognized if at least one of: the characterizing variable changes by more than a first expected value; the correction variable changes by more than a second expected value; and a corrected torque variable changes by more than a third expected value.

8. The method according to claim 7, wherein an engine speed is controlled to an idle speed while idling.

9. An apparatus for monitoring one of a drive unit of a vehicle and components allocated to the drive unit, comprising:
   an arrangement for determining a torque variable characterizing a torque requirement of at least one of the drive unit and the allocated components; and
   an arrangement for recognizing faults based on at least one of the torque variable and a base variable, wherein the torque variable is determined based on the base variable;

a controller to control an operating characteristic to a target value in selected operating states, wherein the controller exhibits at least integral behavior; and an arrangement for determining a correction variable based on a deviation of a characterizing variable from a specified value, and for correcting the torque variable with the correction value, wherein the characterizing variable characterizes an integral portion of the controller.

10. The apparatus according to claim 9, wherein an engine speed is controlled to an idle speed while idling.

11. The apparatus according to claim 9, wherein faults are recognized based on at least one of the characterizing variable, the correction variable and a corrected torque variable.

12. The apparatus according to claim 11, wherein an engine speed is controlled to an idle speed while idling.

13. The apparatus according to claim 9, wherein faults are recognized if at least one of: the characterizing variable is greater than a first threshold value; and the correction variable is greater than a second threshold value.

14. The apparatus according to claim 13, wherein an engine speed is controlled to an idle speed while idling.

15. The apparatus according to claim 9, wherein faults are recognized if at least one of: the characterizing variable changes by more than a first expected value; the correction variable changes by more than a second expected value; and a corrected torque variable changes by more than a third expected value.

16. The apparatus according to claim 15, wherein an engine speed is controlled to an idle speed while idling.

* * * * *